(12) United States Patent
Nick et al.

(10) Patent No.: US 7,972,428 B2
(45) Date of Patent: Jul. 5, 2011

(54) PROCESS FOR PREPARING MODIFIED PIGMENTS

(75) Inventors: Robert J. Nick, Pepperell, MA (US); Eugene N. Step, Newton, MA (US)

(73) Assignee: Cabot Corporation, Boston, MA (US)

( * ) Notice: Subject to any disclaimer, the term of this patent is extended or adjusted under 35 U.S.C. 154(b) by 1275 days.

(21) Appl. No.: 11/512,697

(22) Filed: Aug. 30, 2006

(65) Prior Publication Data

US 2007/0044682 A1    Mar. 1, 2007

Related U.S. Application Data

(60) Provisional application No. 60/712,871, filed on Aug. 31, 2005.

(51) Int. Cl.
   *C09D 11/00* (2006.01)
(52) U.S. Cl. .................................................. 106/31.6
(58) Field of Classification Search ................. 106/31.6
   See application file for complete search history.

(56) References Cited

U.S. PATENT DOCUMENTS

| | | | |
|---|---|---|---|
| 5,554,739 A | 9/1996 | Belmont | |
| 5,571,311 A | 11/1996 | Belmont | |
| 5,609,671 A | 3/1997 | Nagasawa | |
| 5,630,868 A | 5/1997 | Belmont et al. | |
| 5,672,198 A | 9/1997 | Belmont | |
| 5,707,432 A | 1/1998 | Adams et al. | |
| 5,803,959 A | 9/1998 | Johnson et al. | |
| 5,830,265 A | 11/1998 | Tsang et al. | |
| 5,837,045 A | 11/1998 | Johnson et al. | |
| 5,851,280 A | 12/1998 | Belmont et al. | |
| 5,885,335 A | 3/1999 | Adams et al. | |
| 5,922,118 A | 7/1999 | Johnson et al. | |
| 5,976,233 A | 11/1999 | Osumi et al. | |
| 5,985,016 A | 11/1999 | Tsang et al. | |
| 6,042,643 A | 3/2000 | Belmont et al. | |
| 6,214,100 B1 | 4/2001 | Parazak et al. | |
| 6,221,142 B1 | 4/2001 | Wang et al. | |
| 6,328,894 B1 | 12/2001 | Chan et al. | |
| 6,398,858 B1 | 6/2002 | Yu et al. | |
| 6,436,178 B1 | 8/2002 | Hosmer | |
| 6,494,943 B1 | 12/2002 | Yu et al. | |
| 6,506,245 B1 * | 1/2003 | Kinney et al. | 106/493 |
| 6,641,656 B2 | 11/2003 | Yu et al. | |
| 6,699,319 B2 | 3/2004 | Adams et al. | |
| 6,706,105 B2 | 3/2004 | Takada et al. | |
| 6,723,783 B2 | 4/2004 | Palumbo et al. | |
| 6,740,151 B2 | 5/2004 | Belmont et al. | |
| 6,822,781 B1 | 11/2004 | Amici et al. | |
| 7,025,820 B2 | 4/2006 | Champlin et al. | |
| 7,300,504 B2 | 11/2007 | Shakhnovich | |
| 7,393,403 B2 | 7/2008 | Lee et al. | |
| 7,579,080 B2 | 8/2009 | Vasudevan | |
| 2002/0147252 A1 | 10/2002 | Adams | |

FOREIGN PATENT DOCUMENTS

EP   1 061 106 B1   6/2000
WO   WO 2004067643 A1 *   8/2004

* cited by examiner

*Primary Examiner* — Jerry Lorengo
*Assistant Examiner* — Veronica Faison Gee

(57) ABSTRACT

A process for preparing a modified pigment having attached at least one organic group is described. This process comprises the step of combining, in any order, a colored pigment, an aromatic amine, a base, and an aqueous medium to form a mixture, and then combining the mixture and a diazotizing agent to form the modified pigment. The aromatic amine comprises at least two carboxylic acid groups, preferably being vicinal. The resulting modified colored pigment can be used in an inkjet ink composition to produce printed images having good overall properties.

36 Claims, No Drawings

PROCESS FOR PREPARING MODIFIED PIGMENTS

CROSS REFERENCE TO RELATED APPLICATIONS

This application claims the benefit of U.S. Provisional Patent Application No. 60/712,871, filed Aug. 31, 2005.

BACKGROUND OF THE INVENTION

1. Field of the Invention

The present invention relates to a process for preparing modified pigments comprising a pigment having attached at least one organic group, as well as to the resulting modified pigments. Inkjet ink compositions are also disclosed.

2. Description of the Related Art

The surface of pigments contain a variety of different functional groups, and the types of groups present depend on the specific class of pigment. Several methods have been developed for grafting materials to the surface of these pigments. For example, it has been shown that polymers can be attached to carbon blacks containing surface groups such as phenols and carboxyl groups. However, methods which rely on the inherent functionality of a pigment's surface cannot be applied generally because not all pigments have the same specific functional groups.

Methods for the preparation of modified pigment products have also been developed which can provide a pigment with a variety of different attached functional groups. For example, U.S. Pat. No. 5,851,280 discloses methods for the attachment of organic groups onto pigments including, for example, attachment via a diazonium reaction wherein the organic group is part of the diazonium salt. The resulting surface-modified pigments can be used in a variety of applications, such as inks, inkjet inks, coatings, toners, plastics, rubbers, and the like. Also, U.S. Pat. Nos. 6,328,894, 6,398,858, 6,214,100, and 6,221,142 describe modified pigments having attached organic groups, including groups comprising at least two carboxylic acid salt groups.

Other methods to prepare modified pigments have also been described. For example, PCT Publication No. WO 01/51566 discloses methods of making a modified pigment by reacting a first chemical group and a second chemical group to form a pigment having attached a third chemical group. Ink compositions containing these pigments are also described.

While these methods provide modified pigments having attached groups, there remains a need for improved processes for attaching groups and, in particular, organic groups comprising at least two carboxylic acid groups or salts thereof, to a pigment. These additional methods may provide advantageous alternatives to forming modified pigments as well as providing modified pigments with good overall performance in applications such as inkjet inks.

SUMMARY OF THE INVENTION

The present invention relates to a process for preparing a modified pigment. In one embodiment, the process comprises the steps of: a) combining, in any order, a pigment, an aromatic amine, a base, and an aqueous medium to form a mixture, and b) combining the mixture and a diazotizing agent to form the modified pigment. In a second embodiment, the process comprises the steps of: a) combining, in any order, a pigment, a diazotizing agent, a base, and an aqueous medium to form a mixture, and b) combining the mixture and an aromatic amine to form the modified pigment. For both embodiments, the aromatic amine comprises at least two carboxylic acid groups, preferably at least one vicinal dicarboxylic acid group.

The present invention further relates to the modified pigment produced by the process described herein as well as to inkjet ink compositions comprising a liquid vehicle and the modified pigment. Images generated on a substrate with the inkjet ink composition of the present invention have been found to have improved overall performance properties.

It is to be understood that both the foregoing general description and the following detailed description are exemplary and explanatory only and are intended to provide further explanation of the present invention, as claimed.

DETAILED DESCRIPTION OF THE INVENTION

The present invention relates to a process for preparing a modified pigment having attached at least one organic group, as well as to inkjet ink compositions.

In one embodiment, the process of the present invention comprises the step of combining a pigment, an aromatic amine, a base, and an aqueous medium to form a mixture. These can be combined in any order. The resulting mixture and a diazotizing agent are then combined to form the modified pigment. Each component will be described in more detail below.

The pigment used in the process of the present invention can be any type of pigment conventionally used by those skilled in the art, such as black pigments and other colored pigments. Preferably, when the pigment is a black pigment, the pigment is carbon black. Mixtures of different pigments can also be used. These pigments can also be used in combination with a variety of different types of dispersants in order to form stable dispersions and inks.

Representative examples of black pigments include various carbon blacks (Pigment Black 7) such as channel blacks, furnace blacks and lamp blacks, and include, for example, carbon blacks sold under the Regal®, Black Pearls®, Elftex®, Monarch®, Mogul®, and Vulcan® trademarks available from Cabot Corporation (such as Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® L, Elftex® 8, Monarch® 1400, Monarch® 1300, Monarch® 1100, Monarch® 1000, Monarch® 900, Monarch® 880, Monarch® 800, Monarch® 700, Mogul® L, Regal® 330, Regal® 400, Vulcan® P).

The pigment may also be chosen from a wide range of conventional colored pigments. The colored pigment can be blue, black, brown, cyan, green, white, violet, magenta, red, orange, yellow, as well as mixtures thereof. Suitable classes of colored pigments include, for example, anthraquinones, phthalocyanine blues, phthalocyanine greens, diazos, monoazos, pyranthrones, perylenes, heterocyclic yellows, quinacridones, and (thio)indigoids. Such pigments are commercially available in either powder or press cake form from a number of sources including, BASF Corporation, Engelhard Corporation and Sun Chemical Corporation. Examples of other suitable colored pigments are described in the Colour Index, 3rd edition (The Society of Dyers and Colourists, 1982).

The pigment can have a wide range of BET surface areas, as measured by nitrogen adsorption, depending on the desired properties of the pigment. As known to those skilled in the art, a higher the surface area will correspond to smaller particle size. If a higher surface area is not readily available for the desired application, it is also well recognized by those skilled in the art that the pigment may be subject to conventional size reduction or comminution techniques, such as ball or jet milling, to reduce the pigment to a smaller particle size, if desired.

The aromatic amine used in the process of the present invention may be any aromatic or heteroaromatic compound substituted with an amine group, including, for example, an aniline derivative (i.e., a substituted benzeneamine). The aromatic amine further comprises at least two carboxylic acid groups. Preferably, the carboxylic acid groups are vicinal, meaning that they are adjacent to each. Thus, the aromatic amine used in the process of the present invention is substituted with at least one group that comprises two adjacent carboxylic acid groups (i.e., carboxylic acid groups bonded to adjacent or neighboring carbon atoms) having the general structure (HOOC)—C—C—(COOH), sometimes also referred to as a vicinal dicarboxylic acid or a 1,2-dicarboxylic acid. The group comprising the two carboxylic acid groups may be an aromatic group or an alkyl group, and therefore the vicinal dicarboxylic acid group may be a vicinal alkyl dicarboxylic acid or a vicinal aryl dicarboxylic acid group. Preferably the group comprising the vicinal dicarboxylic acid group is an aromatic group. Thus, the aromatic amine preferably comprises a —$C_6H_3$—$(COOH)_2$ group, wherein the carboxylic acid groups are in positions ortho to each other. More preferably, the aromatic amine is the group comprising the two carboxylic acid groups. Thus, for example, the aromatic amine is more preferably a benzeneamine substituted with at least two carboxylic acid groups in positions ortho to each other, such as 4-aminobenzene-1,2-dicarboxylic acid (also referred to as 4-aminophthalic acid). Other substitution patterns are also possible and will be known to one skilled in the art. In addition, other substituents besides the carboxylic acid groups may also be present on the aromatic amine, as long as these substituents do not interfere with formation of the modified pigment.

The aromatic amine may comprise more than two carboxylic acid groups. Thus, the aromatic amine may comprise a group having three or more carboxylic acid groups, wherein at least two of the carboxylic acid groups are adjacent to each other, forming a vicinal dicarboxylic acid group. For example, the aromatic amine may comprise a 1,2,3- or 1,2,4-tricarboxylic acid group, such as a —$C_6H_2$—$(COOH)_3$ group, or may comprise a 1,2,3,4- or 1,2,4,5-tetra carboxylic acid group, such as a —$C_6H$—$(COOH)_4$ group. Other substitution patterns are also possible and will be known to one skilled in the art. More preferably, the aromatic amine is 5-aminobenzene-1,2,3-tricarboxylic acid or 5-aminobenzene-1,2,4-tricarboxylic acid.

The base used in the process of the present invention may be any water soluble alkaline reagent that generates OH— ions in an aqueous medium, thereby raising the pH of the medium. Examples include carbonates such as sodium carbonate, bicarbonates such as sodium bicarbonate, and alkoxides such as sodium methoxide and sodium ethoxide. Preferably, the base is a hydroxide reagent, which is any reagent that comprises an OH— ion, such as a salt having an hydroxide counterion. Examples include sodium hydroxide, potassium hydroxide, lithium hydroxide, and ammonium hydroxide. Other hydroxide salts, as well as mixtures of hydroxide reagents, can also be used.

The aqueous medium used in the process of the present invention can be any medium containing greater than 50% water. Thus, the aqueous medium can be, for example, water or mixtures of water with water miscible solvents such as alcohols. Preferably the aqueous vehicle is water.

For this embodiment of the process of the present invention, the pigment, the aromatic amine, the base, and the aqueous medium are combined to form a mixture. This mixture may be in the form of a wet paste or may be a dispersion, depending on the amount of aqueous medium used. Preferably the mixture is a dispersion, and, more preferably, the resulting modified pigment is also in dispersion form. Furthermore, additional components, such as, for example, dispersants or surfactants, can be included in either step of the process of the present invention, although such additives are not particularly necessary to produce the disclosed modified pigments. Such additional component may provide additional benefits, such as improved stability if the mixture or modified pigment are in the form of a dispersion.

The amount of base used in the process of the present invention can be any amount as long as the level does not have a negative impact of the preparation of the modified pigment. Preferably, the amount of base used is chosen relative to the type of aromatic amine used, and, more specifically, based on the molar amount of carboxylic acid groups present. For example, it is preferred that the molar ratio of base to carboxylic acid groups of the aromatic amine be less than 1 to 1. Preferably, the molar ratio of base to carboxylic acid groups of the aromatic amine is between 0.33 and 0.67 to 1, more preferably between 0.37 and 0.6 to 1, and most preferably between 0.4 and 0.5 to 1. For example, if the aromatic amine comprises a tricarboxylic acid group, the molar ratio of base to carboxylic acid group is preferably between 1 and 2 to 1, more preferably between 1.1 and 1.8 to 1, and most preferably between 1.2 and 1.5 to 1.

The pigment, aromatic amine, base, and aqueous medium can be combined in any order to form the mixture used to prepare the modified pigment. Fore example, the aromatic amine and base can be combined, optionally in the aqueous medium. Since, as discussed in more detail above, the amount of base is preferably less than the total amount of carboxylic acid groups present (i.e., a molar ratio of base to carboxylic acid group of less that 1 to 1), the combination of aromatic amine and base generally forms a mixture of aromatic amines. This mixture comprises an aromatic amine having at least one carboxylic acid group and at least one carboxylic acid salt group. In essence, the combination of the aromatic amine comprising at least two carboxylic acid groups and the base forms a mixture of aromatic amine products comprising an aromatic amine in which one carboxylic acid group has been deprotonated. The resulting mixture of aromatic amines and the pigment, can then be combined, optionally further in the aqueous medium, to form a mixture used to prepare the desired modified pigment.

As another example, the pigment and the aromatic amine can be combined, optionally with the aqueous medium, to form a pigment mixture. The base and this mixture can then be combined, optionally further in the aqueous medium, to form the mixture used to prepare the desired modified pigment.

For this first embodiment of the process of the present invention, the process further comprises the step of combining a diazotizing agent and the mixture resulting from combining, in any order, the pigment, aromatic amine, base, and aqueous medium as described above, to form the modified pigment. The diazotizing agent used in the process of the present invention may be any reagent that reacts with an amine group to form a diazonium salt. Examples include nitrous acid and nitrite salts. Preferably, the diazotizing agent is a salt having a nitrite counterion such as sodium nitrite, potassium nitrite, or calcium nitrite.

In a second embodiment of the process of the present invention, the process comprises the step of combining a pigment, a diazotizing agent, a base, and an aqueous medium to form a mixture. These can be combined in any order. The resulting mixture and an aromatic amine are then combined to form the modified pigment. These component can be any of those that are described in more detail above.

For both embodiment of the process of the present invention, the components can be combined using any method known in the art. For example, the components can be combined under high shear conditions. For the purposes of the present invention, "high shear" means an energy sufficient to produce and/or maintain a pigment particle size distribution throughout the mixing step, which continually exposes new surfaces of the pigment to the added components, thereby improving the distribution and level of attachment as well as the overall product yield. The mixing may take place in any suitable vessel under high shear conditions and utilizes equipment capable of providing a continued particle size reduction. Examples include, but are not limited to, equipment capable of providing a grinding, impact, or similar impingement action, such as horizontal media mills, vertical media mills such as attritors, ball mill, hammer mills, pin disk mills, fluid energy mills, jet mills, fluid jet mills, impingement jet mills, rotostators, pelletizers, homogenizers, sonicators, cavitators, and the like.

In addition, the vessel may be preferably equipped with suitable means for adding heat, such as a heating mantle, thermocouple and the like. The mixing can take place under a wide variety of temperatures and for any suitable time in order to form the desired modified pigment. For example, the components can be combined at a temperature between about −10 and about 50 degrees C., such as between about 0 and about 25 degrees C. or between about 0 and about 10 degrees C. Combining the components within these temperature ranges has been found to produce aqueous colored pigment dispersions efficiently and with minimal side products. Also, the mixing can preferably take place under high solids conditions—that is, the pigment is present in the mixture at levels preferably greater than 10% by weight.

Surprisingly it has been found that a modified pigment can be prepared by combining a pigment, an aromatic amine comprising more than one carboxylic acid group, an aqueous medium, and a diazotizing agent, in the orders described above, and further including a base. While methods are known for forming modified pigments having attached organic groups in which a diazotizing agent and an aromatic amine are combined to form a diazonium salt, which can be combined with a pigment to form the modified pigment, these methods typically do not include a base. Acid is needed in order to assist in the diazonium salt formation and attachment process. If base has been used in these methods, it has generally been added after the modified pigment has been produced. However, it has now been found that base can be added at the beginning of the process, prior to the addition of a diazotizing agent, without having a negative impact on the preparation of the modified pigment having attached carboxylic acid salt groups. It has further been found that, when the preferred levels of base described above are used, the modified pigments produced have improved properties, particularly in inkjet ink compositions, compared to those prepared by a similar method in which base is not included.

The present invention further relates to a modified pigment comprising a pigment having attached at least one organic group, wherein the organic group comprises at least one carboxylic acid salt group. The pigment can be any of those described in more detail above. Preferably, the organic group comprises at least two carboxylic acid salt groups, and more preferably comprises at least three carboxylic acid salt groups. The modified pigment may be produced by any method known in the art but is preferably prepared by the process of the present invention.

The amount of attached organic groups can be varied, depending on the desired use of the modified pigment and the type of attached group. Preferably, the total amount of organic group is from about 0.01 to about 10.0 micromoles of groups/$m^2$ surface area of pigment, as measured by nitrogen adsorption (BET method). For example, the amount of electrophilic groups may be from about 0.5 to about 4.0 micromoles/$m^2$, including from about 1 to about 3 micromoles/$m^2$ or from about 2 to about 2.5 micromoles/$m^2$. Additional attached organic groups which do not comprise carboxylic acid salt groups may also be present.

The modified pigment may be either in a solid form, such as a powder or a paste, or in a dispersion form. For example, the modified pigment may be produced in the form of a dispersion, and isolated from the dispersion in the form of a solid. Alternatively, a solid form of the modified pigment may be produced directly. Preferably the modified pigment is in the form of a dispersion. The modified pigment dispersion may be purified by washing, such as by filtration, centrifugation, or a combination of the two methods, to remove unreacted raw materials, byproduct salts and other reaction impurities. The products may also be isolated, for example, by evaporation or it may be recovered by filtration and drying using known techniques to those skilled in the art.

The modified pigment dispersion may be purified by washing, such as by filtration, centrifugation, or a combination of the two methods, to remove unreacted raw materials, byproduct salts and other reaction impurities. The modified pigment may also be isolated, for example, by evaporation or may be recovered by filtration and drying using known techniques to those skilled in the art. The modified pigment may also be dispersed into a liquid medium, and the resulting dispersions may be purified or classified to remove impurities and other undesirable free species which can co-exist in the dispersion as a result of the manufacturing process. For example, the dispersion can be purified to remove any undesired free species, such as unreacted treating agent using known techniques such as ultrafiltration/diafiltration, reverse osmosis, or ion exchange.

The modified pigment of the present invention may be useful in a variety of applications. In particular, the colored pigment dispersions have surprisingly been found to be effective inkjet ink compositions. Therefore, the present invention further relates to an inkjet ink composition comprising a liquid vehicle and the modified pigment of the present invention. The vehicle can be either an aqueous or non-aqueous liquid vehicle, but is preferably a vehicle that contains water. Thus, the vehicle is preferably an aqueous vehicle, which is a vehicle that contains greater than 50% water and can be, for example, water or mixtures of water with water miscible solvents such as alcohols. Preferably the aqueous vehicle is water, and the inkjet ink composition is an aqueous inkjet ink composition.

The modified pigment can be present in the inkjet ink composition in an amount effective to provide the desired image quality (for example, optical density) without detrimentally affecting the performance of the inkjet ink. For example, typically, the modified pigment can be present in an amount ranging from about 0.1% to about 30% based on the weight of the ink. More or less modified pigment may be used depending on the amount of attached organic group or the number of carboxylic acid salt groups present. It is also within the bounds of the present invention to use a mixture of the modified pigment described herein and unmodified pigments, other modified pigments, or both.

The inkjet ink composition of the present invention can be formed with a minimum of additional components (additives and/or cosolvents) and processing steps. However, suitable additives may be incorporated in order to impart a number of desired properties while maintaining the stability of the compositions. For example, surfactants and/or dispersants, humectants, drying accelerators, penetrants, biocides, binders, and pH control agents, as well as other additives known in the art, may be added. The amount of a particular additive will vary depending on a variety of factors but generally ranges between 0% and 40%.

Dispersing agents (surfactants and/or dispersants) may be added to further enhance the colloidal stability of the composition or to change the interaction of the ink with either the printing substrate, such a printing paper, or with the ink printhead. Various anionic, cationic and nonionic dispersing agents can be used in conjunction with the ink composition of the present invention, and these may be in solid form or as a water solution.

Representative examples of anionic dispersants or surfactants include, but are not limited to, higher fatty acid salts, higher alkyldicarboxylates, sulfuric acid ester salts of higher alcohols, higher alkyl-sulfonates, alkylbenzenesulfonates, alkylnaphthalene sulfonates, naphthalene sulfonates (Na, K, Li, Ca, etc.), formalin polycondensates, condensates between higher fatty acids and amino acids, dialkylsulfosuccinic acid ester salts, alkylsulfosuccinates, naphthenates, alkylether carboxylates, acylated peptides, -olefine sulfonates, N-acrylmethyl taurine, alkylether sulfonates, secondary higher alcohol ethoxysulfates, polyoxyethylene alkylphenylether sulfates, monoglycylsulfates, alkylether phosphates and alkyl phosphates. For example, polymers and copolymers of styrene sulfonate salts, unsubstituted and substituted naphthalene sulfonate salts (e.g. alkyl or alkoxy substituted naphthalene derivatives), aldehyde derivatives (such as unsubstituted alkyl aldehyde derivatives including formaldehyde, acetaldehyde, propylaldehyde, and the like), maleic acid salts, and mixtures thereof may be used as the anionic dispersing aids. Salts include, for example, $Na^+$, $Li^+$, $K^+$, $Cs^+$, $Rb^+$, and substituted and unsubstituted ammonium cations. Specific examples include, but are not limited to, commercial products such as Versa® 4, Versa® 7, and Versa® 77 (National Starch and Chemical Co.); Lomar® D (Diamond Shamrock Chemicals Co.); Daxad®19 and Daxad® K (W. R. Grace Co.); and Tamol® SN (Rohm & Haas). Representative examples of cationic surfactants include aliphatic amines, quaternary ammonium salts, sulfonium salts, phosphonium salts and the like.

Representative examples of nonionic dispersants or surfactants that can be used in ink jet inks of the present invention include fluorine derivatives, silicone derivatives, acrylic acid copolymers, polyoxyethylene alkyl ether, polyoxyethylene alkylphenyl ether, polyoxyethylene secondary alcohol ether, polyoxyethylene styrol ether, polyoxyethylene lanolin derivatives, ethylene oxide derivatives of alkylphenol formalin condensates, polyoxyethylene polyoxypropylene block polymers, fatty acid esters of polyoxyethylene polyoxypropylene alkylether polyoxyethylene compounds, ethylene glycol fatty acid esters of polyethylene oxide condensation type, fatty acid monoglycerides, fatty acid esters of polyglycerol, fatty acid esters of propylene glycol, cane sugar fatty acid esters, fatty acid alkanol amides, polyoxyethylene fatty acid amides and polyoxyethylene alkylamine oxides. For example, ethoxylated monoalkyl or dialkyl phenols may be used, such as Igepal® CA and CO series materials (Rhone-Poulenc Co.) Briji® Series materials (ICI Americas, Inc.), and Triton® series materials (Union Carbide Company). These nonionic surfactants or dispersants can be used alone or in combination with the aforementioned anionic and cationic dispersants.

The dispersing agents may also be a natural polymer or a synthetic polymer dispersant. Specific examples of natural polymer dispersants include proteins such as glue, gelatin, casein and albumin; natural rubbers such as gum arabic and tragacanth gum; glucosides such as saponin; alginic acid, and alginic acid derivatives such as propyleneglycol alginate, triethanolamine alginate, and ammonium alginate; and cellulose derivatives such as methyl cellulose, carboxymethyl cellulose, hydroxyethyl cellulose and ethylhydroxy cellulose. Specific examples of polymeric dispersants, including synthetic polymeric dispersants, include polyvinyl alcohols; polyvinylpyrrolidones; acrylic or methacrylic resins (often written as "(meth)acrylic") such as poly(meth)acrylic acid, acrylic acid-(meth)acrylonitrile copolymers, potassium (meth)acrylate-(meth)acrylonitrile copolymers, vinyl acetate-(metha)acrylate ester copolymers and (meth)acrylic acid-(meth)acrylate ester copolymers; styrene-acrylic or methacrylic resins such as styrene-(meth)acrylic acid copolymers, styrene-(meth)acrylic acid-(meth)acrylate ester copolymers, styrene-methylstyrene-(meth)acrylic acid copolymers, styrene-methylstyrene-(meth)acrylic acid-(meth)acrylate ester copolymers; styrene-maleic acid copolymers; styrene-maleic anhydride copolymers, vinyl naphthalene-acrylic or methacrylic acid copolymers; vinyl naphthalene-maleic acid copolymers; and vinyl acetate copolymers such as vinyl acetate-ethylene copolymer, vinyl acetate-fatty acid vinyl ethylene copolymers, vinyl acetate-maleate ester copolymers, vinyl acetate-crotonic acid copolymer and vinyl acetate-acrylic acid copolymer; and salts thereof.

Humectants and water soluble organic compounds may also be added to the inkjet ink composition of the present invention, particularly for the purpose of preventing clogging of the nozzle as well as for providing paper penetration (penetrants), improved drying (drying accelerators), and anti-cockling properties. Specific examples of humectants and other water soluble compounds that may be used include low molecular-weight glycols such as ethylene glycol, diethylene glycol, triethylene glycol, tetraethylene glycol and dipropylene glycol; diols containing from about 2 to about 40 carbon atoms, such as 1,3-pentanediol, 1,4-butanediol, 1,5-pentanediol, 1,4-pentanediol, 1,6-hexanediol, 1,5-hexanediol, 2,6-hexanediol, neopentylglycol (2,2-dimethyl-1,3-propanediol, 1,3-propanediol, 1,4-butanediol, 1,5-pentanediol, 1,6-hexanediol, 1,2,6-hexanetriol, poly(ethylene-co-propylene) glycol, and the like, as well as their reaction products with alkylene oxides, including ethylene oxides, including ethylene oxide and propylene oxide; triol derivatives containing from about 3 to about 40 carbon atoms, including glycerine, trimethylpropane, 1,3,5-pentanetriol, 1,2,6-hexanetriol, and the like as well as their reaction products with alkylene oxides, including ethylene oxide, propylene oxide, and mixtures thereof; neopentylglycol, (2,2-dimethyl-1,3-propanediol), and the like, as well as their reaction products with alkylene oxides, including ethylene oxide and propylene oxide in any desirable molar ratio to form materials with a wide range of molecular weights; thiodiglycol; pentaerythritol and lower alcohols such as ethanol, propanol, iso-propyl alcohol, n-butyl alcohol, sec-butyl alcohol, and tert-butyl alcohol, 2-propyn-1-ol (propargyl alcohol), 2-buten-1-ol, 3-buten-2-ol, 3-butyn-2-ol, and cylcopropanol; amides such as dimethyl formaldehyde and dimethyl acetamide; ketones or ketoalcohols such as acetone and diacetone alcohol; ethers such as tetrahydrofurane and dioxane; cellosolves such as ethylene glycol monomethyl ether and ethylene glycol monoethyl ether, triethylene glycol monomethyl (or monoethyl) ether; carbitols such as diethylene glycol monomethyl ether, diethylene glycol monoethyl ether, and diethylene glycol monobutyl ether; lactams such as 2-pyrrolidone, N-methyl-2-pyrrolidone and—caprolactam; urea and urea derivatives; inner salts such as betaine, and the like; thio (sulfur) derivatives of the aforementioned materials including 1-butanethiol; t-butanethiol 1-methyl-1-propanethiol, 2-methyl-1-propanethiol; 2-methyl-2-propanethiol; thiocyclopropanol, thioethyleneglycol, thiodiethyleneglycol, trithio- or dithio-diethyleneglycol, and the like; hydroxyamide derivatives, including acetylethanolamine, acetylpropanolamine, propylcarboxyethanolamine, propylcarboxy propanolamine, and the like; reaction products of the aforementioned materials with alkylene oxides; and mixtures thereof. Additional examples include saccharides such as maltitol, sorbitol, gluconolactone and maltose; polyhydric alcohols such as trimethylol propane and trimethylol ethane; N-methyl-2-pyrrolidene; 1,3-dimethyl-2-imidazolidinone; sulfoxide derivatives containing from about 2 to about 40 carbon atoms, including dialkylsulfides (symmetric and asymmetric sulfoxides) such as dimethylsulfoxide, methylethylsulfoxide, alkylphenyl sulfoxides, and the like; and sulfone derivatives (symmetric and asymmetric sulfones) containing from about 2 to about 40 carbon atoms, such as dimethylsulfone, methylethylsulfone, sulfolane (tetramethylenesulfone, a cyclic sulfone), dialkyl sulfones, alkyl phenyl sulfones, dimethylsulfone, methylethylsulfone, diethylsulfone, ethylpropylsulfone, methylphenylsulfone, methylsulfolane, dimethylsulfolane, and the like. Such materials may be used alone or in combination.

Biocides and/or fungicides may also be added to the inkjet ink composition of the present invention. Biocides are important in preventing bacterial growth since bacteria are often larger than ink nozzles and can cause clogging as well as other printing problems. Examples of useful biocides include, but are not limited to, benzoate or sorbate salts, and isothiazolinones.

Various polymeric binders can also be used in conjunction with the inkjet ink composition of the present invention to adjust the viscosity of the composition as well as to provide other desirable properties. Suitable polymeric binders include, but are not limited to, water soluble polymers and copolymers such as gum arabic, polyacrylate salts, polymethacrylate salts, polyvinyl alcohols, hydroxypropylenecellulose, hydroxyethylcellulose, polyvinylpyrrolidinone, polyvinylether, starch, polysaccharides, polyethyleneimines with or without being derivatized with ethylene oxide and propylene oxide including the Discole® series (DKS International); the Jeffamine® series (Texaco); and the like. Additional examples of water-soluble polymer compounds include various dispersants or surfactants described above, including, for example, styrene-acrylic acid copolymers, styrene-acrylic acid-alkyl acrylate terpolymers, styrene-methacrylic acid copolymers, styrene-maleic acid copolymers, styrene-maleic acid-alkyl acrylate terpolymers, styrene-methacrylic acid-alkyl acrylate terpolymers, styrene-maleic acid half ester copolymers, vinyl naphthalene-acrylic acid copolymers, alginic acid, polyacrylic acids or their salts and their derivatives. In addition, the binder may be added or present in dispersion or latex form. For example, the polymeric binder may be a latex of acrylate or methacrylate copolymers or may be a water dispersible polyurethane.

Various additives for controlling or regulating the pH of the inkjet ink composition of the present invention may also be used. Examples of suitable pH regulators include various amines such as diethanolamine and triethanolamine as well as various hydroxide reagents. The hydroxide reagent can be any of those described above, including sodium hydroxide, potassium hydroxide, lithium hydroxide, ammonium hydroxide, and tetramethyl ammonium hydroxide. Other hydroxide salts, as well as mixtures of hydroxide reagents, can also be used. Furthermore, other alkaline reagents may also be used which generate OH— ions in an aqueous medium. Examples include carbonates such as sodium carbonate, bicarbonates such as sodium bicarbonate, and alkoxides such as sodium methoxide and sodium ethoxide. Buffers may also be added.

Additionally, the inkjet ink composition of the present invention may further incorporate dyes to modify color balance and adjust optical density. Such dyes include food dyes, FD&C dyes, acid dyes, direct dyes, reactive dyes, derivatives of phthalocyanine sulfonic acids, including copper phthalocyanine derivatives, sodium salts, ammonium salts, potassium salts, lithium salts, and the like.

The inkjet ink composition can be purified and/or classified using methods such as those described above for the modified pigments of the present invention. An optional counterion exchange step can also be used. In this way, unwanted impurities or undesirable large particles can be removed to produce an ink with good overall properties.

The present invention further relates to an inkjet ink set which comprises various inkjet ink compositions and includes the inkjet ink composition of the present invention. The inkjet ink compositions of this set may differ in any way known in the art. For example, the inkjet ink set may comprise inkjet ink compositions comprising different types and/or colors of pigments, including, for example, an inkjet ink composition comprising a cyan pigment, an inkjet ink composition comprising a magenta pigment, and/or an inkjet ink composition comprising a black pigment. Other types of inkjet ink compositions may also be used, including, for example, compositions comprising agents designed to fix the inkjet ink compositions onto the substrate. Other combinations will be known in the art.

The present invention will be further clarified by the following examples which are intended to be only exemplary in nature.

EXAMPLES

Examples 1-21

The following general procedure, which is an embodiment of the process of the present invention, was used to prepare modified pigments of the present invention.

Black Pearls® 700 carbon black (available from Cabot Corporation), 5-aminobenzene-1,2,3-tricarboxylic acid (ABTA), and water were combined in a ProcessAll 4HV Mixer (4 liter), which was then sealed, and mixing began. A 10% NaOH solution was prepared and added to the reactor over 1-2 minutes. The total amount of water used was 850 mL. The resulting mixture was mixed in the ProcessAll at the set temperature for one hour. After this, a 20% aqueous sodium nitrite solution (1 equivalent relative to the amount of aromatic amine used) was then added to the mixture over approximately 15 minutes, and mixing was continued for an additional 2 hours. A modified pigment was formed, which was then removed from the reactor in the form of a thick paste (approximately 35% solids). One volume of dilution water (approximately 850 mL) and two rinses were added to the ProcessAll to rinse out all the residues, and this was combined with the paste to form a dispersion of the modified pigment. The pH of this dispersion was then adjusted to 8.5 with a 2M NaOH solution, and the sample was further diluted with water to 10% solids. This was then centrifuged using a Carr Powerfuge at 300 mL/min. and 15KG's. The centrifugation was continuous and the sample was centrifuged into a clean bucket and then recirculated for approximately five minutes. The centrifuged dispersion was diafiltered using Spectrum Diafiltration Membranes with deionized water as the make-up. Five volumes of make-up water was used and the final conductivity of the permeate was below 250 µS. At the end of the diafiltration process, the sample was concentrated so that the final solids were approximately 15%. Proxel Biocide (0.2 wt. %) was then added, and the sample was then filtered using a Pall set-up with a 0.5 µm filter to form a dispersion comprising the modified pigment having attached carboxylic acid salt groups.

The amounts of each component and the conditions used for these examples are found in Table 1 below. The amount of base is shown as the molar ratio of base to carboxylic acid group of the ABTA.

TABLE 1

| Example | Molar ratio of NaOH | ABTA (mmol/g pigment) | Temperature (° C.) |
|---|---|---|---|
| 1 | 1.00 | 0.40 | 65 |
| 2 | 1.20 | 0.37 | 56 |
| 3 | 1.20 | 0.37 | 74 |
| 4 | 1.20 | 0.43 | 56 |
| 5 | 1.20 | 0.43 | 73 |
| 6 | 1.20 | 0.43 | 74 |
| 7 | 1.20 | 0.47 | 73 |
| 8 | 1.20 | 0.52 | 73 |
| 9 | 1.20 | 0.60 | 73 |
| 10 | 1.50 | 0.35 | 65 |
| 11 | 1.50 | 0.40 | 50 |
| 12 | 1.50 | 0.40 | 65 |
| 13 | 1.50 | 0.40 | 65 |
| 14 | 1.50 | 0.40 | 65 |
| 15 | 1.50 | 0.40 | 80 |
| 16 | 1.50 | 0.45 | 65 |
| 17 | 1.80 | 0.37 | 56 |
| 18 | 1.80 | 0.37 | 74 |
| 19 | 1.80 | 0.43 | 56 |
| 20 | 1.80 | 0.43 | 74 |
| 21 | 2.00 | 0.40 | 65 |

The properties of the resulting modified pigment dispersions are shown in Table 2 below. The modified pigment of Example 21 was not produced in a stable dispersion form and is therefore not included in Table 2. For each of these examples, particle size was determined using a Microtrac® Particle Size Analyzer, and the values reported are the mean volume particle size (mV). $Na^+$ concentration was measured using an ion selective electrode (Thermo Orion Sure-flow Ross sodium probe, calibrated for solutions containing 20 ppm to 6000 ppm sodium ions). Alternatively, $Na^+$ concentration could also be determined by combustion analysis, with comparable results. Titratable levels, in mmoles of titrable groups/g of pigment, were measured by titration using a Titrino 736 auto-titration machine in the pH range of 4 to 10. Viscosity was measured using a Brookfield IV II+programmable viscometer.

TABLE 2

| Example | final pH | % solids | mv (m) | Visc (cp) | $Na^+$ level (ppm) | Titratable (mmol/g) |
|---|---|---|---|---|---|---|
| 1 | 8.46 | 14.96 | 0.129 | 2.01 | 9227 | 0.38 |
| 2 | 9.05 | 14.68 | 0.132 | 2.02 | 8896 | 0.34 |
| 3 | 8.70 | 15.09 | 0.129 | 2.09 | 8820 | 0.35 |
| 4 | 8.48 | 15.06 | 0.122 | 1.86 | 9977 | 0.39 |
| 5 | 8.86 | 15.45 | 0.133 | 1.84 | 11607 | 0.43 |
| 6 | 9.03 | 14.58 | 0.122 | 1.95 | 11390 | 0.44 |
| 7 | 8.72 | 14.52 | 0.128 | 1.83 | 12112.5 | 0.46 |
| 8 | 8.67 | 15.11 | 0.130 | 1.86 | 12177.5 | 0.45 |
| 9 | 8.96 | 14.87 | 0.126 | 1.78 | 14260.5 | 0.50 |
| 10 | 9.05 | 14.89 | 0.131 | 2.14 | 8773 | 0.32 |
| 11 | 8.80 | 14.55 | 0.131 | 2.20 | 8026 | 0.34 |
| 12 | 8.90 | 14.54 | 0.161 | 2.27 | 5605 | 0.26 |
| 13 | 9.02 | 14.95 | 0.130 | 1.95 | 9641 | 0.37 |
| 14 | 8.58 | 15.32 | 0.129 | 2.17 | 8101 | 0.33 |
| 15 | 9.48 | 14.94 | 0.134 | 1.98 | 9856 | 0.35 |
| 16 | 9.05 | 14.70 | 0.131 | 2.04 | 9526 | 0.37 |
| 17 | 8.61 | 14.98 | 0.153 | 2.39 | 5929 | 0.25 |
| 18 | 10.1 | 14.71 | 0.149 | 2.23 | 7683 | 0.28 |
| 19 | 8.77 | 14.07 | 0.164 | 2.42 | 7095 | 0.30 |
| 20 | 10.31 | 15.32 | 0.149 | 2.15 | 8789 | 0.29 |

As the data in Table 2 shows, the process of the present invention provides modified pigments having attached having attached carboxylic acid salts groups, as evidenced by the $Na^+$ levels after purification and by the titration results. In addition, these modified pigments produce dispersion having small particle sizes and low viscosities, indicating they would be useful in an inkjet ink composition.

Example 22-24

A modified pigment having attached carboxylic acid salt groups was prepared using a procedure similar to that described above, with the exception that Pigment Blue 15:4 (for Example 22), Pigment Red 122 (for Example 23), and Pigment Yellow 74 (for Example 24) (presscakes, available from Sun Chemical), were used instead of Black Pearls® 700 carbon black. The temperature of the process was between 50 and 55 degrees C. The molar ratio of base to carboxylic acid group of the ABTA was 1.2 and the amount of ABTA was 1.0 mmoles/g pigment.

The properties of the resulting modified pigment dispersions are shown in Table 3 below.

TABLE 3

| Example | final pH | % solids | mv (m) | Visc (cp) | $Na^+$ level (ppm) | Titratable (mmol/g) |
|---|---|---|---|---|---|---|
| 22 | 8.59 | 9.84 | 0.0924 | 1.74 | 3021 | 0.12 |
| 23 | 8.55 | 10.65 | 0.1037 | 2.06 | 2924 | 0.09 |
| 24 | 9.06 | 9.57 | 0.1128 | 1.50 | 3863 | 0.13 |

As the data in Table 3 shows, the process of the present invention provides modified colored pigments having attached having attached carboxylic acid salts groups, as evidenced by the $Na^+$ levels after purification and by the titration results. In addition, these modified pigments produce dispersion having small particle sizes and low viscosities, indicating they would be useful in an inkjet ink composition.

Example 25

An inkjet ink composition was prepared comprising a modified pigment of the present invention prepared following the procedure described in Examples 1-21 above using a 1.50 molar ratio of NaOH and an ABTA level of 0.40 mmoles/g pigment, similar to those of Examples 11-15 above. The formulation used is shown in Table 5 below.

TABLE 5

| Ingredient | Amount |
|---|---|
| 2-pyrrolidinone | 7.0% |
| 1,5-pentanediol | 7.0% |
| trimethylol propane | 5.0% |
| Surfynol 465 | 0.20% |

The pH of the modified pigment dispersion was adjusted to 8.5 prior to preparing the inkjet ink composition. The targeted pigment level was 4.0%, taking into account the weight of the attached groups. The balance of the formulation was water.

Print performance testing was conducted by printing test images with an HP Photosmart P1000 printer onto three types of plain paper: Great White Ink Jet (GWIJ), Hammermill Copy Plus (HCP), and Hewlett Packard Bright White (HPBW). The optical density (OD or visual density) of the test images was measured with a MacBeth densitometer and average over the paper set. The resulting average OD was found to be 1.23.

This shows that the modified pigment of the present invention can be used to prepared jettable inkjet ink compositions that produce images having good properties. It would be expected that variations could be made by one skilled in the art to the formulation to produce images having improved or tailored performance properties, including bleed, waterfastness, smearfastness, and the like.

Examples 26-28

Inkjet ink compositions were prepared as in Example 25, with the exception that the modified pigment of Examples 22-24 were used. For Example 26, the modified cyan pigment of Example 22 was used, for Example 27, the modified magenta pigment of Example 23 was used, and for Example 28, the modified yellow pigment of Example 24 was used. Print performance testing was conducted by printing test images with an HP Photosmart P1000 printer onto three types of plain paper: Hammermill Copy Plus (HCP), Hewlett Packard Bright White (HPBW), and Xerox 4024 (X4024). L, a, and b for the test images were measured with an Image X-Pert. Results are shown in Table 6 below.

TABLE 6

| | HCP | | | HPBW | | | X4024 | | |
|---|---|---|---|---|---|---|---|---|---|
| Ex # | L | a | b | L | a | b | L | a | b |
| 26 | 41.37 | −11.49 | −40.23 | 42.09 | −10.35 | −47.05 | 42.61 | −12.13 | −41.16 |
| 27 | 40.84 | 46.94 | −8.24 | 39.39 | 54.77 | −11.42 | 39.35 | 49.79 | −9.05 |
| 28 | 84.89 | 1.46 | 76.93 | 85.01 | 4.83 | 89.90 | 83.92 | 1.76 | 75.87 |

This shows that the modified colored pigments of the present invention can be used to prepared jettable inkjet ink compositions that produce images having good properties. It would be expected that variations could be made by one skilled in the art to the formulation to produce images having improved or tailored performance properties, including bleed, waterfastness, smearfastness, and the like.

Comparative Example 1

A modified pigment having attached carboxylic acid salt groups was prepared using a procedure similar to that described above, with the exception that no base was used. For this example, the amount of ABTA was 0.4 mmoles/g of pigment. The properties of the resulting modified pigment dispersion are shown in Table 4 below.

TABLE 4

| Example | final pH | % solids | mv (m) | Visc (cp) | Na$^+$ level (ppm) | Titratable (mmol/g) |
|---|---|---|---|---|---|---|
| Comp Ex 1 | 8.38 | 15.8 | 0.1208 | 2.10 | 11139 | 0.36 |

As the data shows, the modified pigment dispersion prepared without the addition of base has similar overall properties than those produced using the process of the present invention.

An inkjet ink composition was prepared using the same formulation shown for Examples 25-28, with the exception that the pigment was the modified pigment of Comparative Example 1. The average optical density was measured as described above and found to be 1.17.

Thus, the inkjet ink composition of Comparative Example 1, comprising a modified pigment that was not prepared using the process of the present invention, gave an average optical density value that was lower than that of an image produced using the inkjet ink composition of Example 25, which is an inkjet ink composition of the present invention. In addition, mottle (grey variance) and edge acuity of the images produced using the inkjet ink composition of the present invention were visibly observed to be superior to images generated using the comparative inkjet ink composition. Thus, while the modified pigments of Example 25 and Comparative Example 1 were prepared using similar methods, the introduction of base into the process prior to attachment produced a modified pigment that is different than that prepared without base, in the same inkjet ink formulation, and inkjet ink composition comprising this modified pigment of the present invention has been found to have improved properties. In addition, it would be expected that the formulation could be further optimized by one skilled in the art to produce images having improved or tailored performance properties, including bleed, waterfastness, smearfastness, and the like.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A process for preparing a modified pigment comprising the steps of:
   a) combining, in any order, a pigment, an aromatic amine, a base, and an aqueous medium to form a mixture, and
   b) combining the mixture and a diazotizing agent to form the modified pigment, wherein the aromatic amine comprises at least two carboxylic acid groups, and the base and the carboxylic acid groups are present in the mixture in a molar ratio of between 0.33 and 0.67 to 1.

2. The process of claim 1, wherein at least two of the carboxylic acid groups are vicinal.

3. The process of claim 1, wherein the aromatic amine comprises at least three carboxylic acid groups.

4. The process of claim 1, wherein the base and the carboxylic acid groups are present in the mixture in a molar ratio of between 0.33 and 0.67 to 1.

5. The process of claim 1, wherein the base and the carboxylic acid groups are present in the mixture in a molar ratio of between 0.37 and 0.60 to 1.

6. The process of claim 1, wherein an aqueous dispersion of the modified pigment is formed in step b).

7. The process of claim 1, wherein the pigment comprises a blue pigment, a black pigment, a brown pigment, a cyan pigment, a green pigment, a white pigment, a violet pigment, a magenta pigment, a red pigment, an orange pigment, a yellow pigment, or mixtures thereof.

8. The process of claim 1, wherein the pigment is carbon black.

9. The process of claim 1, wherein the aromatic amine comprises at least one —$C_6H_3$—$(COOH)_2$ group or at least one —$C_6H_2$—$(COOH)_3$ group.

10. The process of claim 1, wherein the aromatic amine is 5-aminobenzene-1,2,3-tricarboxylic acid, 5-aminobenzene-1,2,4-tricarboxylic acid, or 4-aminobenzene-1,2-dicarboxylic acid.

11. The process of claim 1 wherein the base is a hydroxide reagent.

12. The process of claim 9, wherein the hydroxide reagent is sodium hydroxide, potassium hydroxide, lithium hydroxide, ammonium hydroxide, or mixtures thereof.

13. The process of claim 1, wherein the aqueous medium is water.

14. The process of claim 1, wherein the diazotizing agent is a nitrite.

15. The process of claim 1, wherein, in step a), the aromatic amine and the base are combined, optionally in the aqueous medium, to form a mixture of aromatic amines.

16. The process of claim 15, wherein the mixture of aromatic amines comprises at least one aromatic amine comprising at least one carboxylic acid group and at least one carboxylic acid salt group.

17. The process of claim 1, wherein, in step a), the pigment and the aromatic amine are combined, optionally in the aqueous medium, to form a pigment mixture.

18. The process of claim 1, wherein the modified pigment comprises the pigment having attached at least one organic group, wherein the organic group comprises at least one carboxylic acid salt group.

19. The process of claim 18, wherein the organic group comprises at least two carboxylic acid salt groups.

20. The process of claim 18, wherein the organic group comprises at least three carboxylic acid salt groups.

21. A process for preparing a modified pigment comprising the steps of:
   a) combining, in any order, a pigment, a diazotizing agent, a base, and an aqueous medium to form a mixture, and
   b) combining the mixture and an aromatic amine to form the modified pigment, wherein the aromatic amine comprises at least two carboxylic acid groups, and the base and the carboxylic groups are present in a molar ratio of between 0.33 and 0.67 to 1.

22. A modified pigment comprising a pigment having attached at least one organic group, wherein the modified pigment is prepared by a process comprising the steps of:
   a) combining, in any order, a pigment, an aromatic amine, a base, and an aqueous medium to form a mixture, and
   b) combining the mixture and a diazotizing agent to form the modified pigment, wherein the aromatic amine comprises at least two carboxylic acid groups, the organic group comprises at least one carboxylic acid salt group, and the base and the carboxylic acid groups are present in the mixture in a molar ratio of between 0.33 and 0.67 to 1.

23. The modified pigment of claim 22, wherein at least two of the carboxylic acid groups are vicinal.

24. The modified pigment of claim 22, wherein the aromatic amine comprises at least three carboxylic acid groups.

25. The modified pigment of claim 22, wherein the organic group comprises at least two carboxylic acid salt groups.

26. The modified pigment of claim 22, wherein the organic group comprises at least three carboxylic acid salt groups.

27. A modified pigment comprising a pigment having attached at least one organic group, wherein the modified pigment is prepared by a process comprising the steps of:
   a) combining, in any order, a pigment, a diazotizing agent, a base, and an aqueous medium to form a mixture, and
   b) combining the mixture and an aromatic amine to form the modified pigment, wherein the aromatic amine comprises at least two carboxylic acid groups, the organic group comprises at least one carboxylic acid salt group, and the base and the carboxylic acid groups are present in the mixture in a molar ratio of between 0.33 and 0.67 to 1.

28. An inkjet ink composition comprising a liquid vehicle and a modified pigment comprising a pigment having attached at least one organic group, wherein the modified pigment is prepared by a process comprising the steps of:
   a) combining, in any order, a pigment, an aromatic amine, a base, and an aqueous medium to form a mixture, and,
   b) combining the mixture and a diazotizing agent to form the modified pigment, wherein the aromatic amine comprises at least two carboxylic acid groups, the organic group comprises at least one carboxylic acid salt group, and the base and the carboxylic acid groups are present in the mixture in a molar ratio of between 0.33 and 0.67 to 1.

29. The inkjet ink composition of claim 28, wherein at least two of the carboxylic acid groups are vicinal.

30. The inkjet ink composition of claim 28, wherein the aromatic amine comprises at least three carboxylic acid groups.

31. The inkjet ink composition of claim 28, wherein the organic group comprises at least two carboxylic acid salt groups.

32. The inkjet ink composition of claim 28, wherein the organic group comprises at least three carboxylic acid salt groups.

33. The inkjet ink composition of claim 28, wherein the liquid vehicle is an aqueous vehicle.

34. The inkjet ink composition of claim 28, wherein an image generated on a substrate with the inkjet ink composition has an optical density of greater than or equal to 1.5.

35. An inkjet ink composition comprising a liquid vehicle and a modified pigment comprising a pigment having attached at least one organic group, wherein the modified pigment is prepared by a process comprising the steps of:
  a) combining, in any order, a pigment, a diazotizing agent, a base, and an aqueous medium to form a mixture, and,
  b) combining the mixture and an aromatic amine to form the modified pigment, wherein the aromatic amine comprises at least two carboxylic acid groups, the organic group comprises at least one carboxylic acid salt group, and the base and the carboxylic acid groups are present in the mixture in a molar ratio of between 0.33 and 0.67 to 1.

36. The process of claim 1, wherein step a) is performed without adding an additional acid.

* * * * *